United States Patent [19]

Bernth et al.

[11] Patent Number: 5,737,617

[45] Date of Patent: Apr. 7, 1998

[54] METHOD AND SYSTEM FOR ENGLISH TEXT ANALYSIS

[75] Inventors: Arendse Bernth; Michael Campbell McCord, both of Ossining, N.Y.; Andrew Tsuneo Tanabe, Rochester, Minn.

[73] Assignee: International Business Machines Corporation, Armonk, N.Y.

[21] Appl. No.: 467,709

[22] Filed: Jun. 6, 1995

[51] Int. Cl.$^6$ .................................................. G06F 17/20
[52] U.S. Cl. .................. 395/759; 395/760; 395/794; 395/803
[58] Field of Search ............... 395/759, 760, 395/792, 793, 794, 795, 803, 752, 753, 755

[56] References Cited

U.S. PATENT DOCUMENTS

| | | | |
|---|---|---|---|
| 4,852,003 | 7/1989 | Zamora | 395/759 |
| 4,868,750 | 9/1989 | Kucera et al. | 395/759 |
| 4,954,984 | 9/1990 | Kaijima et al. | 395/755 |
| 4,994,966 | 2/1991 | Hutchins | 395/759 |
| 5,068,789 | 11/1991 | Van Vliembergen | 395/759 |
| 5,181,163 | 1/1993 | Nakajima et al. | 395/760 |
| 5,243,520 | 9/1993 | Jacobs et al. | 395/759 |
| 5,289,375 | 2/1994 | Fukumochi et al. | 395/752 |
| 5,299,124 | 3/1994 | Fukumochi et al. | 395/752 |
| 5,338,976 | 8/1994 | Anwyl et al. | 395/752 |

OTHER PUBLICATIONS

Nyberg et al., The KANT Machine Translation System: A Brief Overview, 1992, pp. 1–6.
Cap Volmac Lingware Services, 1994, Cap Volmac, Utrecht, pp. 1–8.
Harshburger, et al., IBM Technical Disclosure Bulletin, 1986, pp. 5284–5286.
McCord et al., Natural Language Processing Within A Slot Grammar Framework, Jul. 3, 1991, pp. 229–277.

*Primary Examiner*—Jeffery Hofsass
*Assistant Examiner*—Andrew Hill
*Attorney, Agent, or Firm*—Joan Pennington

[57] ABSTRACT

A computer-implemented method and system are provided for English text analysis. A file of a plurality of English sentences is received and submitted to a parser. A unified parse structure is generated by the parser for predefined ones of the English sentences. A plurality of predetermined critiquing rules are applied to each of the unified parse structures for identifying exceptions to recommended English. Identified exceptions together with related information are stored in an exception file. Then an interactive session with a user is performed utilizing the stored exception file.

17 Claims, 6 Drawing Sheets

METHOD AND SYSTEM FOR ENGLISH TEXT ANALYSIS

FIELD OF THE INVENTION

The present invention relates to a method and system for English text analysis, and more particularly to a method and system for English language text analysis that provides user guidance for authoring text with a reduction of ambiguity in an easy-to-understand, international style.

DESCRIPTION OF THE PRIOR ART

Many style books and guidelines provide principles and examples for good writing. However, it is not easy in technical writing to apply these principles while dealing with the technical concepts and reviewing large quantities of information. It is useful to have a computer tool to help. In addition, existing style books often do not cover some of the problems of ambiguous and obscure writing.

Existing computer-based tools for grammar checking typically deal with generally surface-level grammatical problems, which are not the most serious or common problems for technical writing. Conventional grammar checking computer tools, for example Grammatik, analyze text to detect improper usage but do not deal with language understanding.

When information has to be created for an international audience, there are three major challenges for the writer. Information has to be easily understood by people whose native language is English, by people whose native language is not English and by people who read it after it has been translated into another language.

The problem of understanding information is shown through customer surveys. The person whose native language is English does not always understand the English version of all product information. When this is true, then the person whose native language is not English will also not be able to fully understand the English.

The third challenge, which relates to translation, is the most difficult one to handle, because there are multiple stages within this step. First, the translator must understand the written English and have the skills to translate it into another language as if the product owner had described it to the translator. The second stage is that the user of this translated information must understand the explanation as if the product owner were writing in the user's own native language.

A need exists for a system and method for evaluating English text to provide user guidance so that the resulting revised text is an international and easy-to-understand style of English.

SUMMARY OF THE INVENTION

A principal object of the invention is to provide an improved method and system for English text analysis. Other objects of the invention are to provide a method and system for English language text analysis that provides user guidance for authoring text with a reduction of ambiguity in an easy-to-understand, international style and to provide such method and system that overcome many of the disadvantages of prior art methods.

In brief, a computer-implemented method and system are provided for English text analysis. A file of a plurality of English sentences is received and submitted to a parser. A unified parse structure is generated by the parser for predefined ones of the English sentences. A plurality of predetermined critiquing rules are applied to each of the unified parse structures for identifying exceptions to recommended English. Identified exceptions together with related information are stored in an exception file. Then an interactive session with a user is performed utilizing the stored exception file.

BRIEF DESCRIPTION OF THE DRAWINGS

The present invention, together with the above and other objects and advantages, may best be understood from the following detailed description of the preferred embodiments of the invention illustrated in the drawings, wherein.

DETAILED DESCRIPTION OF THE PREFERRED EMBODIMENTS

Figure 1:
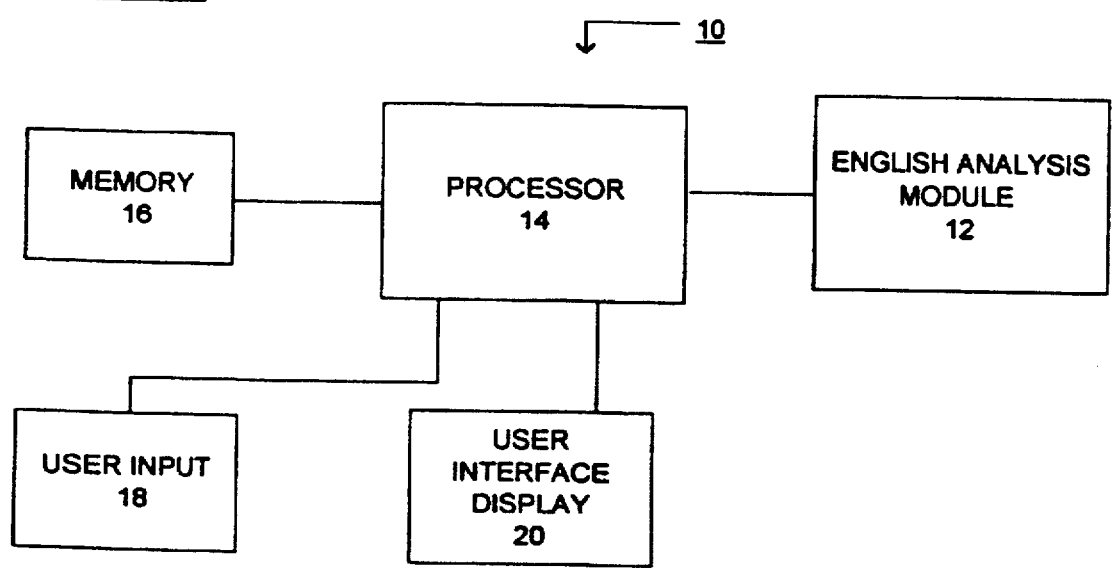
FIG. 1 is a block diagram representation of a computer system embodying the present invention.

In FIG. 1 there is shown a block diagram representation of a computer system 10 for carrying out a method of the invention represented by an English analysis module 12. Computer system 10 includes a processor 14, a memory 16, a user input device 18 and a user interface display 20. Computer system 10 is used with the English analysis module 12 for analyzing English text and flagging possible errors and ambiguity that make the text difficult to understand.

Various commercially available systems, for example, a personal computer, can be used for computer system 10. Processor 14 is suitably programmed to execute the flowcharts of FIGS. 2–5 of the invention.

Figure 2:
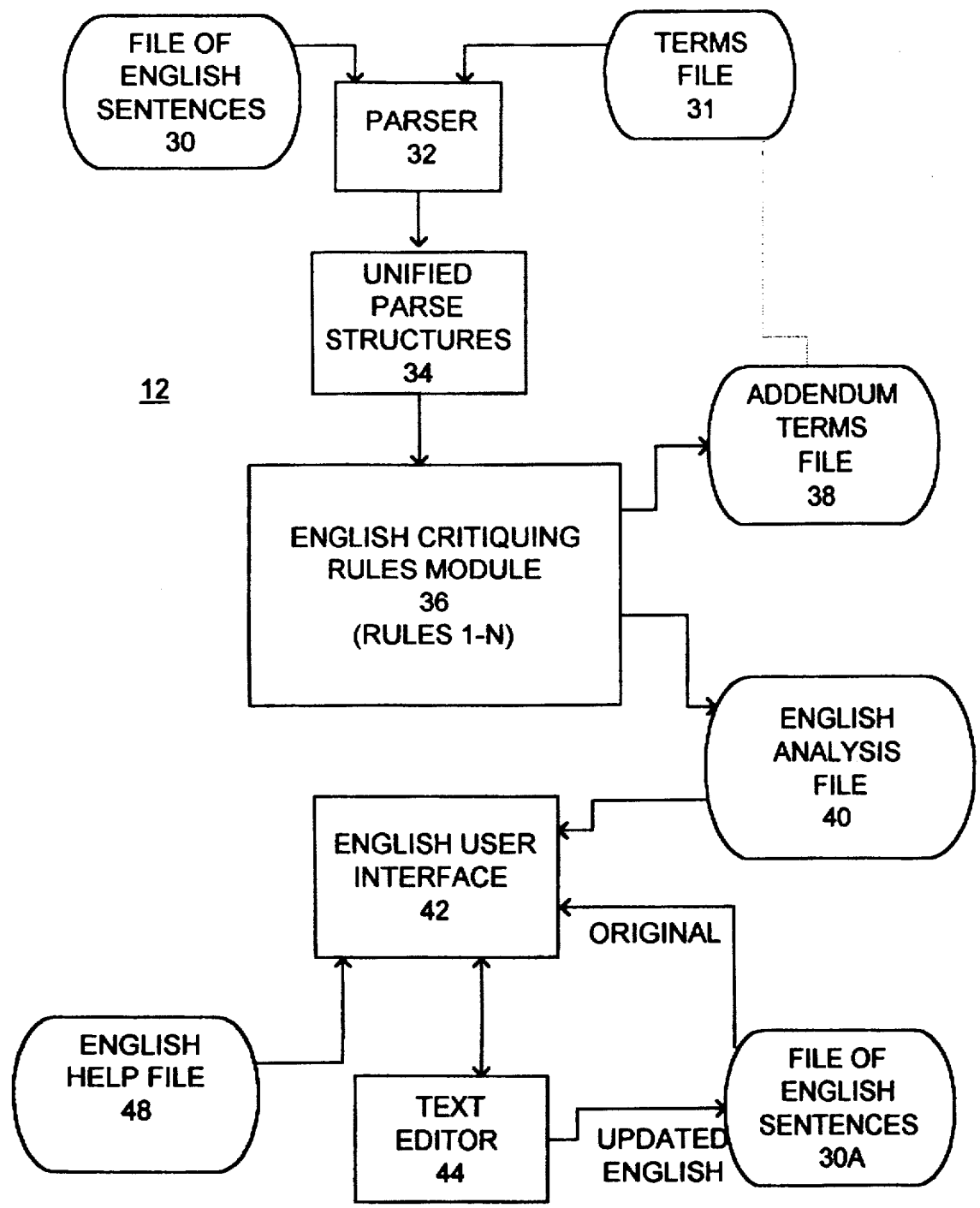
FIG. 2 is a logic flow and functional block diagram illustrating typical structure and data flow of an English analysis module of FIG. 1.

Referring now to FIG. 2, there is shown a logic flow and functional block diagram illustrating typical structure and data flow of the English analysis module 12. A file of English sentences 30 and a terms file 31 are coupled to a parser 32. The terms file 31 is a technical dictionary file including a terms list, such as *IBM AS/400 Word List* and *IBM Dictionary of Computing*. Parser 32 generates unified parse structures 34. An English critiquing rules module 36 applies a plurality of predetermined rules sequentially to the unified parse structures in a batch operation.

Preferably, parser 32 and unified parse structure 34 are arranged in accordance with a known Slot Grammar parser and Slot Grammar structure. The Slot Grammar parser and Slot Grammar are described in "Natural Language Processing Within A Slot Grammar Framework", by Michael McCord, Arendse Bernth, Shalom Lappin and Wlodek Zadrozny, *International Journal on Artificial Intelligence Tools*, Vol. 1, No. 2 (1992) pp. 229–277. The subject matter of the above identified publication is incorporated herein by reference.

In accordance with a feature of the invention, English critiquing rules module 36 examines the natural language parser output and looks for specific syntactic and lexical patterns, on the basis of which recommendations for improvement of the original natural language sentence are made. The recommended improvements are aimed at making the text more understandable and more easily translatable to other languages. The focus of the English critiquing rules module 36 is on the reduction of ambiguity and of constructions that are difficult to translate.

The parser 32 and the English critiquing rules module 36 have the following properties and relationship. The parser 32 is a general-purpose English parser and is designed for many natural applications, including automatic translation. The parser 32 accepts general English text, not just the constructions recommended by the English critiquing rules module 36. The unified parse structures 34 provide both deep predicate-argument information and surface information in the single structure, the unified parse structure (UPS) 34, which is examined by the English critiquing rules module 36. For sentences that are non-grammatical or not recognized for the parser's grammar, the parser 32 constructs a pieced-together analysis to which the English critiquing rules module 36 applies appropriate rules. The parser 32 and the critiquing rules module 36 handle both free text and source text for formatting languages. The parser 32 and critiquing rules module 36 can be specified by the user to apply only to certain specified portions of the document.

The English critiquing rules module 36 operates on the parser output and generates an addendum terms file 38 and an English Analysis file 40 coupled to a user interface 42. Application of the critiquing rules to the unified parse structures 34 consists of sequential exploration of each of the unified parse structures for exceptions to the recommended English. The application of the critiquing rules is illustrated and further described with respect to FIGS. 3 and 4.

The generated English analysis file 40 includes an exception file used by the user interface 42. A text editor program 44 used in conjunction with the user interface 42, provides user-selected updated English for a file of the original English sentences 30A based upon the generated English analysis file 40 and user selections. An English help file 48 is coupled to the user interface 42 for providing general help information to assist the user.

The generated addendum terms file 38 consists of words unknown to the English analysis module 12, and multi-word terms found by module 12. The user can edit the addendum terms file 38 utilizing the text editor program 44 and resubmit the file of English sentences or a selected portion of the file for further processing by the parser 32 and the critiquing rules module 36 with the edited terms file as an addendum lexicon to a terms file 31.

English critiquing rules module 36 sequentially applies critiquing rules that may be divided into three groups, where each group deals with a specific critique or exception category. The three groups include lexical exceptions, punctuation exceptions and syntactic exceptions.

Figure 3:
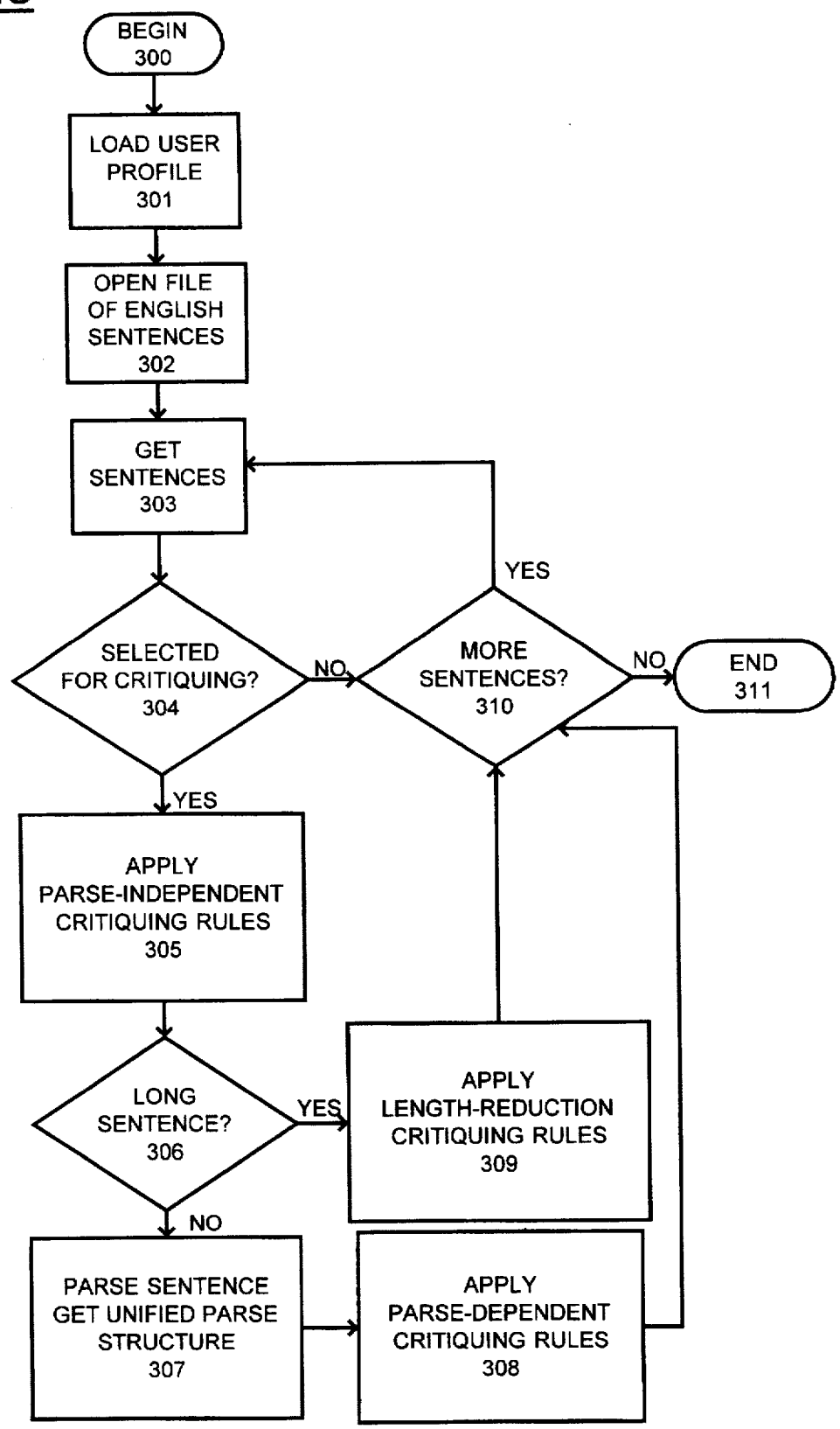
FIG. 3 is a flow diagram illustrating sequential operations of the present invention for applying English analysis rules.

Referring now to FIG. 3, there is shown a flow diagram illustrating sequential operations for applying English analysis rules. The sequential operations begin at a block 300. A user profile is loaded as indicated at a block 301. Then a file of English sentences is opened as indicated at a block 302. A sentence from the file of English sentences is received as indicated at a block 303. Then it is determined whether the sentence has been selected for critiquing as indicated at a decision block 304. The user profile is consulted to determined whether the sentence has been selected for critiquing at block 304. Also, a sentence that includes a table is not selected for critiquing at block 304. If the sentence has been selected for critiquing, then parse-independent critiquing rules are applied to the sentence as indicated at a block 305.

It is determined whether the sentence length exceeds a predefined limit as indicated at a block 306. If the sentence is not a long sentence, the sentence is parsed and a unified parse structure (UPS) for the sentence is received from the parser 32 as indicated at a block 307. Multiple predefined parse-dependent critiquing rules are sequentially applied to the received UPS as indicated at a block 308. Then checking for more sentences is provided as indicated at a block 310. When another sentence is identified at block 310, the sequential steps are repeated, returning to block 303 to get a next sentence. Otherwise, when another sentence is identified at block 310, the sequential steps are completed as indicated at a block 311.

When determined that the sentence is a long sentence at block 306, then length-reduction critiquing rules are applied as indicated at a block 309. Then checking for more sentences is provided at block 310. The sequential steps are repeated until all the sentences in the file have been processed.

Usually, a long sentence can be shortened and simplified by using lists for a lengthy series. A long sentence can also be split into two or more sentences. For the purpose of a cutoff for sentence length, 25 words can be used. In counting the sentence length, Nameit variables are counted as one word and technical noun strings, such as command names that are longer than a predefined number, such as three words, are counted as three words. When a sentence is identified as being too long, then only predefined parse-independent rules are applied to the sentence. Sentences less than 25 words long that are nevertheless too complex are identified.

Predefined rules relating to lexical exceptions include spell-checking. Words unknown to the system including misspelled words and new terminology are flagged or stored in the exception file 40. The unknown words are also put in the addendum terms file 38.

Another rule of the predefined rules 1 through N checks for long noun strings. These are noun strings consisting of more than N nouns, where N is user-specified. These noun strings are flagged and also put in the terms file 38.

Another rule of the predefined rules checks for the first occurrence of acronyms and abbreviations whose full definition is not given. The full definition is supplied by the English critiquing rules module 36. Both singular and plural occurrences are recognized.

Others rules check for an incorrect use of an indefinite article; duplicated words; and Latin abbreviations. Another rule checks for words that are defined as restricted or not-allowed. Both singular and plural occurrences are recognized. Another rule checks for contractions.

Predefined rules relating to punctuation exceptions include rules that check for missing commas between finite clauses, after subordinate clauses, in coordinated noun phrases that consist of three or more conjuncts, and after appositives. Another predefined rule checks for a comma splice which is the use of comma instead of semicolon to separate two independent clauses. Another predefined rule checks for a missing period at the end of a declarative sentence. Another predefined rule checks for a missing question mark at the end of an interrogative sentence.

Predefined rules relating to syntactic exceptions include a predefined rule that checks for ambiguity in coordination of noun phrases with modifiers. Other syntactic exceptions rules include checking for non-parallelism in features of coordinated phrases; ambiguous nonfinite clauses; occurrences of passives; ambiguous uses of double passives; voice shifts; and ambiguous subject modifiers.

In the interactive user session, the identified ambiguities are pointed out and recommendations for rephrasing are displayed for the user. Predefined rules are applied to check for incomplete sentences introducing a list, and ambiguities are pointed out together with recommendations for rephrasing, such as missing that-complement, modal complement, prepositional complement, and "to" without infinitive.

Other predefined rules check for incomplete list items; non-parallelism of list items; and sentences with a missing subject. Other predefined rules check for the use of slash to mean "and/or" and a missing "that" for verbs that take a that-complement, such as "ensure that", and "show that". Another predefined rule checks for the ambiguous use of pronouns.

Other predefined rules check for sentences that are too long or too complex. For identified complex sentences, a recommendation to reduce complexity is provided.

Figure 4:
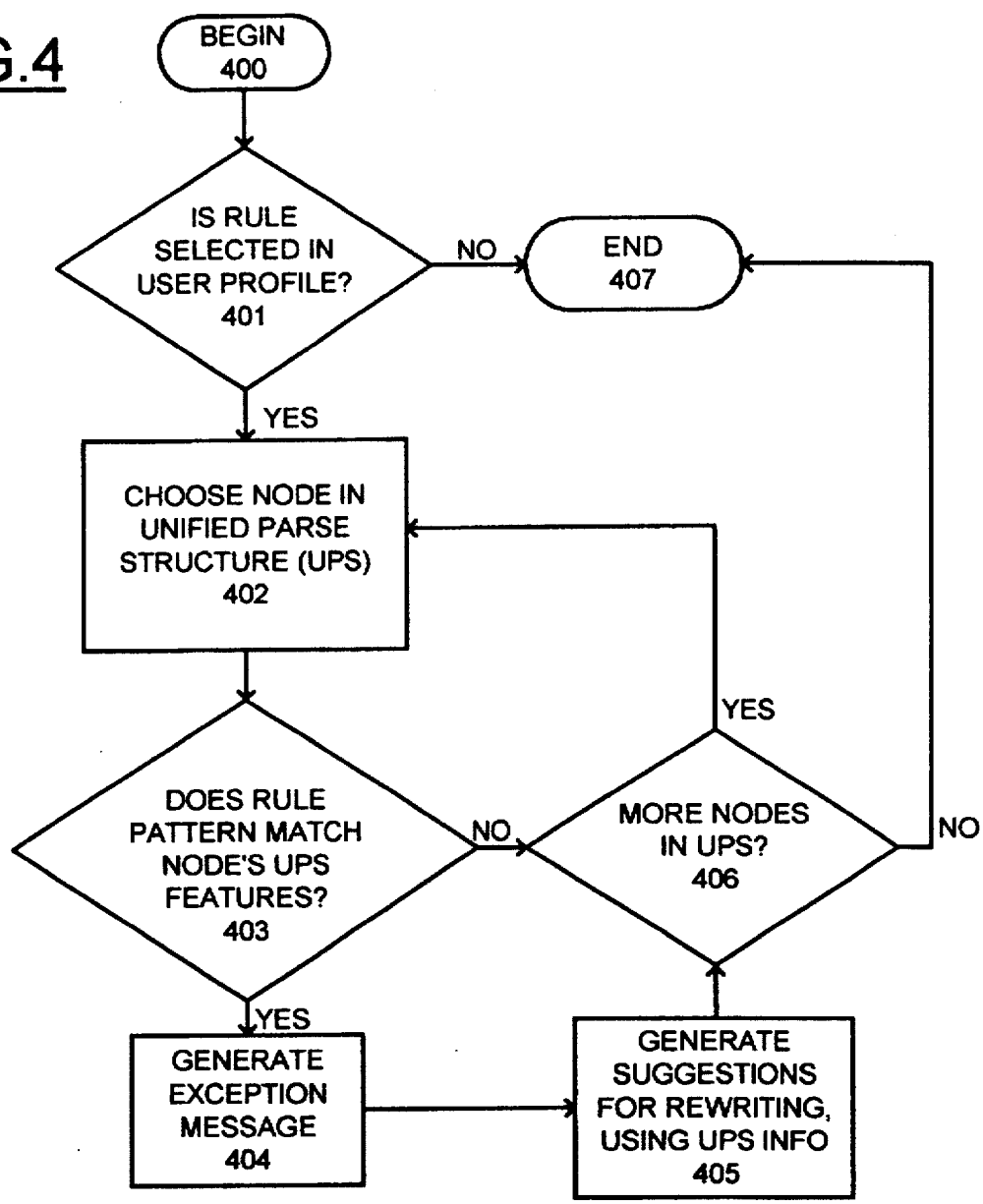
FIG. 4 is a flow diagram illustrating sequential operations of the present invention for applying critiquing rules to a given sentence.

FIG. 4 illustrates sequential operations of the present invention for applying critiquing rules to a given sentence. The sequential operations begin at a block 400. It is determined whether a critiquing rule has been selected in the user profile as indicated at a block 401. When determined that a critiquing rule has been selected at block 401, then a node is chosen in the unified parse structure (UPS) as indicated at a block 402. It is determined whether the rule pattern matches the node's UPS features as indicated at a decision block 403. If so, an exception message is generated as indicated at a block 404. Suggestions for rewriting are generated, using the UPS information as indicated at a block 405. It is determined whether more nodes are in the UPS as indicated at a decision block 406. If not, then the sequential operations are completed as indicated at a block 407. Otherwise, when more nodes are in the UPS, then the sequential operations continue until all the nodes in the UPS have been processed.

Figure 4A:
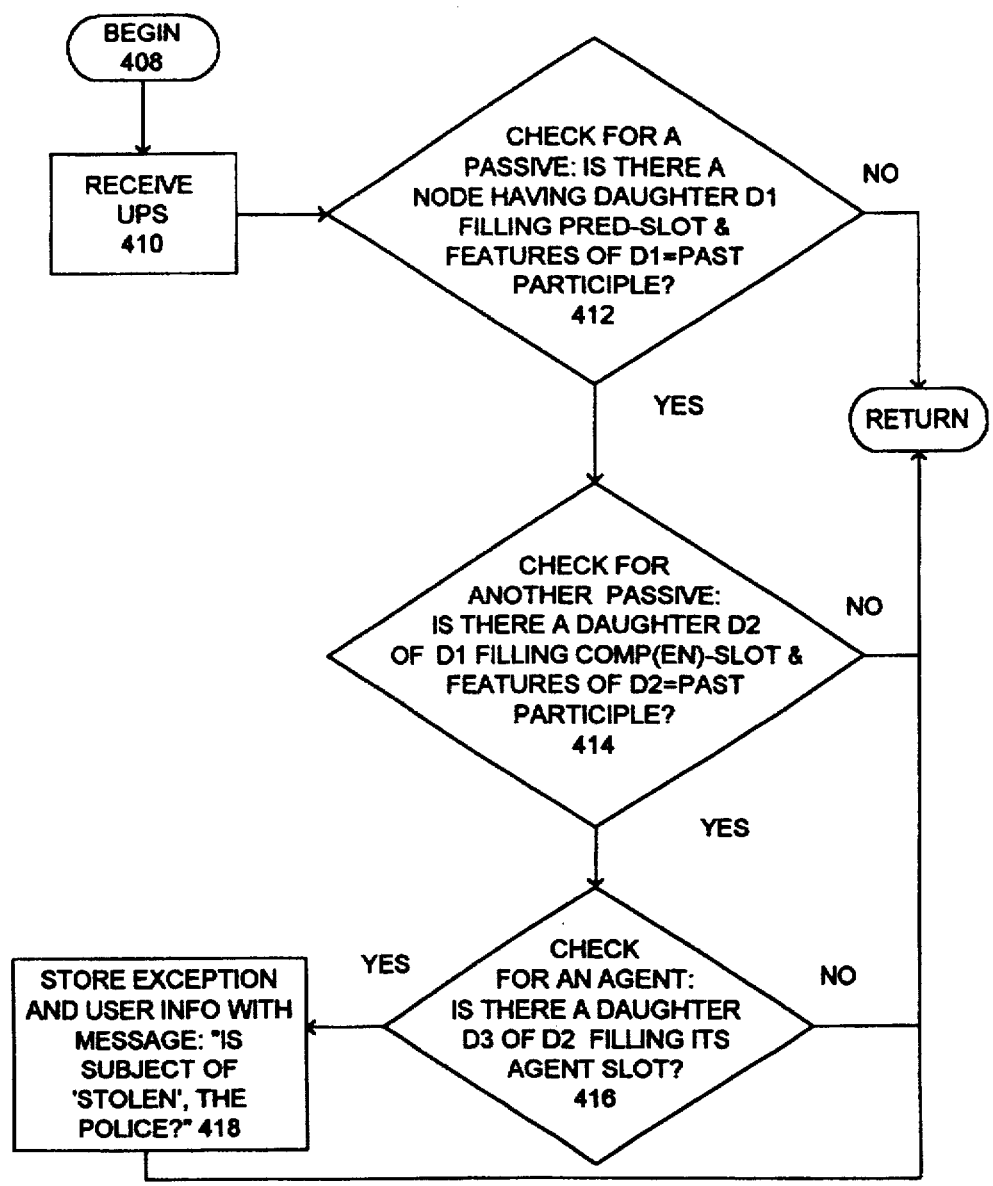
FIG. 4A is a flow diagram illustrating exemplary sequential operations of the present invention for locating an exception and generating an exception message for a user.

Referring to FIG. 4A, exemplary sequential operations are shown for applying a predefined rule, locating an exception and generating an exception message for a user. In FIG. 4A, the predefined rule for checking for ambiguous double passives is illustrated with the following sentence. "Five diamonds were reported stolen by the police." First the unified parse structure is received as indicated at a block 410. Next there is a first check for a passive as indicated at a decision block 412 labeled CHECK FOR PASSIVE: IS THERE A NODE HAVING DAUGHTER D1 FILLING PRED-SLOT & FEATURES OF D1=PAST PARTICIPLE? PRED represents the predicate complement of "be". In the example UPS, "reported" equals D1, providing a positive or yes result at block 412. Next there is a check for another passive as indicated at a decision block 414 labeled CHECK FOR ANOTHER PASSIVE: IS THERE A DAUGHTER D2 OF D1 FILLING COMP(EN)-SLOT & FEATURES OF D2=PAST PARTICIPLE? In the example UPS, "stolen" equals D2, providing a yes result at block 414. COMP(EN) represents a passive past participle complement slot. Next a check for an agent is provided as indicated at a decision block 416 labeled CHECK FOR AN AGENT: IS THERE A DAUGHTER D3 OF D2 FILLING ITS AGENT SLOT? In the example UPS, "by the police" equals D3, providing a yes result at block 416. An exception is stored together with user assistance messages as indicated at a block 418. For example, an output message at block 418 may be the following: "Is subject of 'stolen', the police?"

When any of the rules result in an identified exception, for example, as shown at block 416, a record of the analysis is built and stored as indicated at block 418. The stored information includes the sentence number in the English source file, the type of exception that was found for this sentence, the location of the exception in the sentence, the exception message that accompanies this condition, and recommended recovery actions or suggestions for the user.

In accordance with a feature of the invention, English analysis module 12 performs the batch analysis based on a user profile that can be created and modified by the user. The extent or depth of analysis that is done is selectable by the user based on the profile setting.

Figure 5:
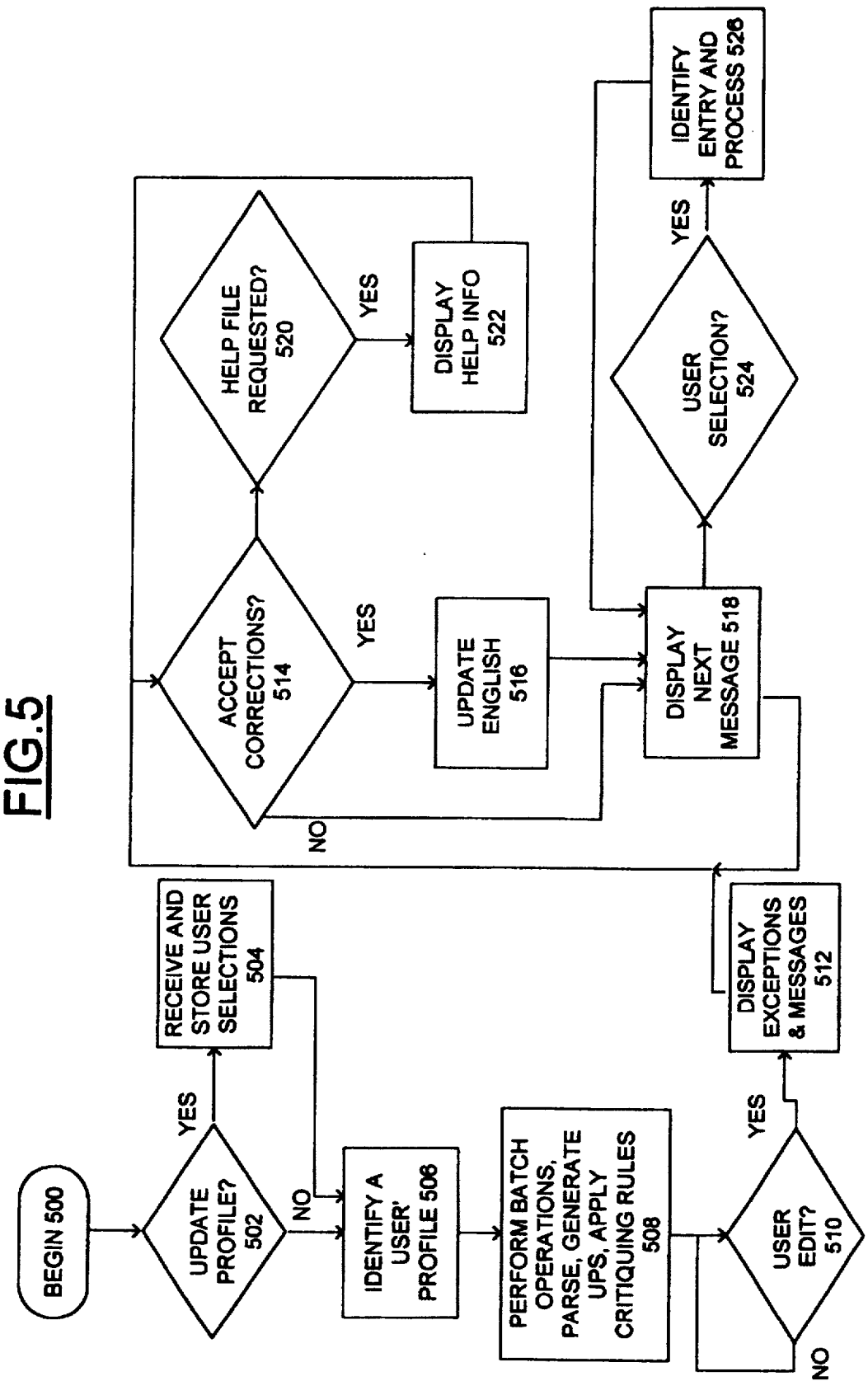
FIG. 5 is a flow diagram illustrating sequential steps for processing user selections in accordance with the present invention.

In FIG. 5, sequential interactive steps for processing user selections are illustrated. To perform the analysis, the user accesses the English analysis module 12 at a block 500 labeled BEGIN. First the user can generate or update a user's profile as indicated at a decision block 502. The user may specify that only certain critiquing rules shall be applied, by generating or updating the user profile along with the document or file of sentences 30 to be analyzed. The user profile is used also to set certain parameters, such as the length restriction on sentences.

Flagging of each type of exceptions or conditions corresponding to the predefined rules applied by the English critiquing rules module 36 can be turned off or on in the user's profile. A combination of rules to be applied or conditions for checking are selected by the user at block 504.

When a user's profile is generated or updated, the user selections are stored with the new user's profile as indicated at a block 504. The new user's profile or a default or previously generated user's profile is identified at a block 506. English analysis module 12 parses the file of sentences 30 or a user-selected portion of the file, generates the unified parse structures 34, and sequentially analyzes the unified parse structures in batch mode as indicated at a block 508.

After the batch run is completed, the user selects the EDIT mode for the file to be reviewed that is identified at a decision block 510. When the user selects the EDIT mode, then the English analysis module 12 displays the identified exceptions or errors, recommended corrections, and predefined user-selectable keys, as indicated at a block 512. Then the user can edit the document under the control of the user interface 42, which displays the exceptions on the basis of the exception file 40. For each displayed exception, the cursor is positioned on the problematic part of the text.

The user can accept or reject recommendations that are given with the exception messages as indicated at a decision block 514. Acceptance or rejection is indicated conveniently via function keys or mouse clicking. If a recommendation is accepted, the new text is automatically substituted for the old text in the file as indicated at a block 516. If a recommendation is not accepted, the user can proceed to see the next exception message as indicated at a block 518. For each exception, the user can access help information for that exception as indicated at a decision block 520. The help information is displayed as indicated at a block 522.

A user selection or entry is identified at a decision block 524. When a user entry is identified at block 524, the user entry or selection is processed at a block 526. For example, the user can edit the file, and the interface will still keep track of the file locations for exception messages. The user can cycle forward or backwards through exception messages. The user can position exception message display at any point in the file. The user can turn on or off the display of exceptions by giving one of the predefined commands, such as IGNORE, which causes the system not to display any exceptions of the specific kind that was just shown. Another command, IGNORE TYPE, causes the system not to display any exceptions of the type that was just shown, for all instances of this type. Another command, IGNORE ALL, causes the system not to display any exceptions at all. Another command, RESTORE xxx, restores the display of messages relating to problem code xxx, where xxx is the problem code given in the help file for that particular problem. Another command, RESTORE ALL, restores the display of all messages. The user interface 42 displays statistics on the various exception messages when it is first activated, and at any later time on command by the user. After the user entry is processed at block 526, the user can proceed to see the next exception message as indicated at block 518.

After the user updates a file and does another analysis, only the changed sentences are analyzed in batch mode at block 508.

While the present invention has been described with reference to the details of the embodiments of the invention shown in the drawing, these details are not intended to limit the scope of the invention as claimed in the appended claims.

What is claimed is:

1. A computer-implemented method for English text analysis comprising the steps of:

receiving a file of a plurality of English sentences;

identifying selected ones of said English sentences for critiquing;

applying a plurality of parse-independent critiquing rules to said identified selected ones of said English sentences;

applying a parser to said received file and generating a unified parse structure for said identified selected ones of said English sentences;

applying a plurality of predetermined parse-dependent critiquing rules to each of said unified parse structures for identifying exceptions to recommended English;

storing identified exceptions together with related information in an exception file; and performing an interactive session with a user utilizing said stored exception file.

2. A computer-implemented method for English text analysis as recited in claim 1 further includes the step of loading a user profile and wherein said step of identifying selected ones of said English sentences for critiquing includes the step of consulting said loaded user profile for identifying selected ones of said English sentences; and wherein said step of applying a plurality of predetermined parse-dependent critiquing rules to each of said unified parse structures for identifying exceptions to recommended English includes the steps of identifying an exception and generating at least one message for assisting the user to correct the exception.

3. A computer-implemented method for English text analysis as recited in claim 1 wherein said step of applying a plurality of predetermined parse-independent critiquing rules to said identified selected ones of said English sentences includes the steps of applying a plurality of predetermined rules for identifying lexical exceptions.

4. A computer-implemented method for English text analysis as recited in claim 1 wherein said step of applying a plurality of predetermined parse-dependent critiquing rules to each of said unified parse structures include the steps of applying a plurality of predetermined rules for identifying punctuation exceptions.

5. A computer-implemented method for English text analysis as recited in claim 1 wherein said step of applying a plurality of predetermined parse-dependent critiquing rules to each of said unified parse structures include the steps of applying a plurality of predetermined rules for identifying syntactic exceptions.

6. A computer-implemented method for English text analysis as recited in claim 5 wherein said step of applying a plurality of predetermined rules for identifying syntactic exceptions includes applying predetermined rules for identifying ambiguous double passives.

7. A computer-implemented method for English text analysis as recited in claim 1 wherein said steps of receiving a file of a plurality of English sentences; identifying selected ones of said English sentences for critiquing; applying a plurality of parse-independent critiquing rules to said identified selected ones of said English sentences; applying a parser to said received file and generating a unified parse structure for each of said identified selected ones of said English sentences; applying a plurality of predetermined parse-dependent critiquing rules to each of said unified parse structures for identifying exceptions to recommended English; and storing identified exceptions together with related information in an exception file are batch mode operations.

8. A computer-implemented method for English text analysis as recited in claim 1 further includes the step of storing predefined types of said identified exceptions in an addendum terms file.

9. A computer-implemented method for English text analysis as recited in claim 7 further includes the steps of coupling a terms file to said parser and storing user-selected stored exceptions in said addendum terms file in said terms file coupled to said parser.

10. A computer system for English text analysis of a file of a plurality of English sentences comprising:

means for identifying selected ones of said English sentences for critiquing;

means for applying a plurality of parse-independent critiquing rules to said identified selected ones of said English sentences;

a parser for receiving the file and generating a unified parse structure for identified selected ones of said English sentences;

English critiquing means for applying a plurality of predetermined parse-dependent rules to each of said unified parse structures for identifying exceptions to recommended English;

English analysis file means for storing identified exceptions together with related information; and user interface means coupled to said English analysis file means for performing an interactive session with a user for revising said file of said plurality of sequential English sentences.

11. A computer system for English text analysis as recited in claim 10 wherein said English critiquing means include means for applying predetermined rules for identifying syntactic exceptions.

12. A computer system for English text analysis as recited in claim 10 wherein said means for applying a plurality of parse-independent critiquing rules to said identified selected ones of said English sentences include means for applying predetermined rules for identifying lexical exceptions.

13. A computer system for English text analysis as recited in claim 10 wherein said English critiquing means include means for applying predetermined rules for identifying punctuation exceptions.

14. A computer system for English text analysis as recited in claim 10 wherein said English critiquing means include means for storing predefined types of identified exceptions in an addendum terms file.

15. A computer system for English text analysis as recited in claim 10 wherein said means for identifying selected ones of said English sentences for critiquing further includes means for identifying a sentence word length and for not selecting sentences having an identified sentence word length greater than a set word length value.

16. A computer system for English text analysis as recited in claim 15 and wherein said means for applying a plurality of parse-independent critiquing rules to said identified selected ones of said English sentences includes means for applying a plurality of predetermined rules to each sentence having an identified sentence word length greater than or equal to said set word length value.

17. A computer system for English text analysis as recited in claim 16 and wherein said means for applying said plurality of predetermined rules to each said sentence include means for applying a plurality of length-reduction critiquing rules.

* * * * *